US008694288B2

(12) United States Patent
Sato et al.

(10) Patent No.: US 8,694,288 B2
(45) Date of Patent: Apr. 8, 2014

(54) CAD PIPE ARRANGEMENT AND PIPE RELATIONSHIP DATABASE VALIDATION

(75) Inventors: Masatake Sato, Tokai (JP); Ichiro Harashima, Hitachiota (JP); Yuhiro Yoshida, Hitachi (JP); Koji Shiroyama, Mito (JP); Toshiyuki Miyake, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 296 days.

(21) Appl. No.: 13/220,738

(22) Filed: Aug. 30, 2011

(65) Prior Publication Data

US 2012/0221298 A1     Aug. 30, 2012

(30) Foreign Application Priority Data

Sep. 2, 2010 (JP) ................. 2010-196285

(51) Int. Cl.
*G06F 17/50* (2006.01)

(52) U.S. Cl.
CPC .......... *G06F 17/509* (2013.01); *G06F 17/5004* (2013.01); *G06F 2217/34* (2013.01)
USPC .......................................................... 703/1

(58) Field of Classification Search
CPC   G06F 2217/34; G06F 17/509; G06F 17/5004
See application file for complete search history.

(56) References Cited

U.S. PATENT DOCUMENTS

| 5,740,341 A * | 4/1998 | Oota et al. ................... 345/420 |
| 7,844,419 B1 * | 11/2010 | Gurrieri et al. ................... 703/1 |
| 2008/0120070 A1 * | 5/2008 | Miller et al. ...................... 703/1 |
| 2011/0209081 A1 * | 8/2011 | Chen et al. ..................... 715/771 |

FOREIGN PATENT DOCUMENTS

JP       2002288250 A       10/2002

OTHER PUBLICATIONS

Deliang, Liu; Huibiao, Lu "Interfere-Check Applying to 3D Automatic Pipe Route Arrangement" IEEE CiSE 2009 conference on Computation Intelligence & Software Engineering (2009) available from <http://ieeexplore.ieee.org/xpls/abs_all.jsp?arnumber=5365920>.*

* cited by examiner

*Primary Examiner* — Kamini S Shah
*Assistant Examiner* — Jay B Hann
(74) *Attorney, Agent, or Firm* — Crowell & Moring LLP

(57) ABSTRACT

An arrangement possible/impossible determination part of a piping order edit device: refers a pipe constituting a pipe list as a pipe subjected to determination; searches a main-branched pipe relationship database for a given pipe using identification information on the pipe subjected to determination as a search key; acquires a main pipe and a branched pipe corresponding to the searched given pipe; and, if there is a branched pipe positioned before the pipe subjected to determination in the pipe list or if there is a main pipe positioned after the pipe subjected to determination in the pipe list, the "arrangement possible/impossible" of the pipe subjected to determination is set at "impossible".

11 Claims, 11 Drawing Sheets

FIG.1A Design assist system

104 Pipe list

| Pipe ID | System name | Diameter |
|---|---|---|
| L-002 | main steam | 500 |
| L-003 | condensate | 600 |
| L-004 | condensate | 650 |
| L-001 | main steam | 800 |
| L-006 | other | 400 |

FIG.5A  Piping and instrumentation diagram

802 Main-branched pipe relationship table

| Pipe ID | Connection pipe ID | Main-branched pipe relationship |
|---|---|---|
| L-001 | L-004 | branched pipe |
| L-002 | L-004 | branched pipe |
| L-003 | none | – |
| L-004 | L-001 | main pipe |
|  | L-002 | main pipe |
|  | L-006 | branched pipe |
| L-006 | L-004 | main pipe |

| Pipe ID | System name | Diameter |
|---|---|---|
| L-002 | main steam | 500 |
| L-003 | condensate | 600 |
| L-004 | condensate | 650 |
| L-001 | main steam | 800 |
| L-006 | other | 400 |

1801 List display data — Highlighted

1202 Arrangement possible/impossible database

| Pipe ID | Arrangement possible/impossible |
|---|---|
| L-002 | O |
| L-003 | O |
| L-004 | × |
| L-001 | O |
| L-006 | △ |

CAD PIPE ARRANGEMENT AND PIPE RELATIONSHIP DATABASE VALIDATION

CROSS REFERENCE TO RELATED APPLICATIONS

This application claims the benefit of Japanese Patent Application No. 2010-196285 filed on Sep. 2, 2010, the disclosure of which is incorporated herein by reference.

BACKGROUND OF THE INVENTION

1. Field of the Invention

The present invention relates to a design assist device, method, and program.

2. Description of the Related Art

In plant design, 3D-CAD has been more and more used as editing software along with recent improvement in capability of computers. A computer in which 3D-CAD runs provides, on its editing screen, a means for arranging various plant installations such as plant equipment, pipes, ducts, and cable trays in a plant, which can assist arrangement and layout design of the plant.

Especially in piping design, because a number of pipes are required to be appropriately arranged in a limited space, there has been disclosed a mechanism of determining piping priority according to pipe attributes such as a diameter and a material of a pipe. For example, Japanese Laid-Open Patent Application, Publication No. 2002-288250 discloses a method of determining a piping priority in automatically arranging a plurality of pipes according to pipe attributes such as a diameter, a material, and a wall thickness of a pipe.

SUMMARY OF THE INVENTION

According to related art, a design assist in view of a spatial restriction of piping has already been conducted. However, a restriction of piping order, that is, in which order a plurality of pipes are to be arranged is still not taken into account. Whether or not an obtained design satisfies the restriction of piping order is known only after a designer manually checks the obtained design.

The restriction of piping order means, more specifically, a restriction in which, if one pipe (a main pipe) has another pipe (a branched pipe) which branches off from the middle of the main pipe, the main pipe has to be arranged first; a relative position for arranging the branched pipe is specified at some point in the middle of the main pipe whose arrangement has already been completed; and the branched pipe is arranged in the specified position. Instead, if the branched pipe is arranged first and then the main pipe is arranged, the branched pipe has to be re-arranged after the arrangement of the main pipe is completed.

In a steam turbine plant, in particular, a large number of pipes to be arranged, and a relationship between a main pipe and a branched pipe becomes more complicated as the number of pipes increases. It becomes too difficult to check the restriction of piping order manually, and a computer is introduced for a check operation. There has been a technique of how to check and verify a piping order with a computer. However, it is still not a well-established technique.

The present invention has been made in an attempt to solve the above-mentioned problems and provide a technique in which a computer verifies whether or not restriction of a piping order is satisfied.

A design assist device which verifies a piping order of a plurality of pipes to be arranged, comprises: a storage unit; an arrangement possible/impossible determination part; and an arrangement possible/impossible display creation part. The design assist device connected to a display device. The storage unit stores therein: a pipe list constituted by an ordered set made up of a plurality of the pipes whose piping order is subjected to verification; and a main-branched pipe relationship database in which a given pipe is made to correspond to none or more main pipes each of which is arranged before the given pipe, and also to none or more branched pipes each of which is arranged after the given pipe. The arrangement possible/impossible determination part: reads the pipe list from the storage unit and determines a pipe constituting the pipe list as a pipe subjected to determination; searches the given pipe in the main-branched pipe relationship database using identification information on the pipe subjected to determination as a search key, acquires a main pipe and a branched pipe corresponding to the searched given pipe, and identifies positions of the acquired main pipe and branched pipe in the pipe list; and, if there is a branched pipe which is situated in a position before the pipe subjected to determination in the pipe list or if there is a main pipe which is situated in a position after the pipe subjected to determination in the pipe list, determines that arrangement of the pipe subjected to determination is impossible, and, if not, determines that the arrangement of the pipe subjected to determination is possible The arrangement possible/impossible display creation part makes the display device display the arrangement possible/impossible of the pipe subjected to determination determined by the arrangement possible/impossible determination part.

Other features and advantages of the present invention will be described hereinafter.

BRIEF DESCRIPTION OF THE DRAWINGS

FIG. 1A is a configuration diagram illustrating a design assist system for assisting design of a piping order according to an embodiment of the present invention.

FIG. 5A and FIG. 5B are illustrating a piping and instrumentation diagram illustrating a result of piping and a configuration diagram illustrating a main-branched pipe relationship table, respectively, according to the embodiment of the present invention.

DETAILED DESCRIPTION OF THE EXEMPLARY EMBODIMENT

Figure 1B:
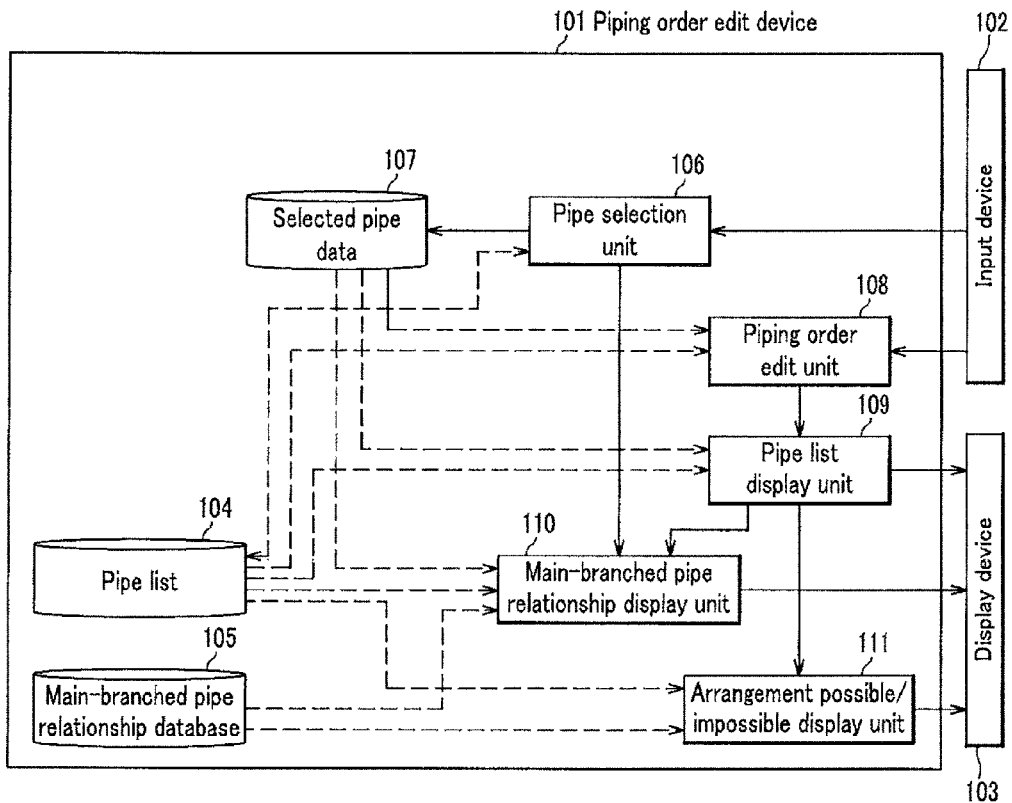
FIG. 1B is a diagram illustrating a pipe list in the design assist system according to the embodiment.

Below is described in detail an embodiment of the present invention with reference to related drawings.

FIG. 1A is a configuration diagram illustrating a design assist system for assisting design of a piping order. The design assist system includes: a piping order edit device 101 (which may also be referred to as a design assist device), an input device 102, and a display device 103.

The piping order edit device 101 is configured as a computer including a CPU, a memory, a hard disk (a storage unit), and a network interface. In the computer, the CPU executes a program loaded into the memory, to thereby cause each processing part to work.

The input device 102 acquires an input from a user by means of a mouse, a keyboard, or the like.

The display device 103 is a display or any other device for displaying information on piping.

The piping order edit device 101 includes a pipe list 104 (see FIG. 1B), a main-branched pipe relationship database 105 (see FIG. 6), a pipe selection unit 106 (see FIG. 9), a selected pipe data 107, a piping order edit unit 108 (see FIG. 2A), a pipe list display unit 109 (see FIG. 2B), a main-branched pipe relationship display unit 110 (see FIG. 3), and an arrangement possible/impossible display unit 111 (see FIG. 4). Note that, if a component is shown in form of a cylinder (for example, the pipe list 104) in configuration diagrams such as FIG. 1, the component is data stored in the storage unit (for example, the hard disk) in the piping order edit device 101.

FIG. 1B is a configuration diagram illustrating the pipe list 104. The pipe list 104 includes, for each pipe, an ID of a pipe, a name of a piping system to which the pipe belongs, and a diameter of the pipe, making those items correspond to one another. Items herein shown in columns other than the pipe ID, namely, the system name and the diameter may also be each referred to as a pipe attribute.

Basically, let one pipe ID be uniquely assigned to one pipe. However, if a plurality of pipes have already been physically connected to constitute one piping group (for example, in a zig-zag manner) and the piping group as a whole is a target for arrangement, one pipe ID can be assigned to the one piping group.

In the pipe list 104, a piping order of the pipes is predetermine, which is from top to bottom of the list. For example, in the pipe list 104 of FIG. 1B, five pipes are arranged in an order of "L-002"→"L-003"→"L-004"→"L-001"→"L-006".

Figure 2A:
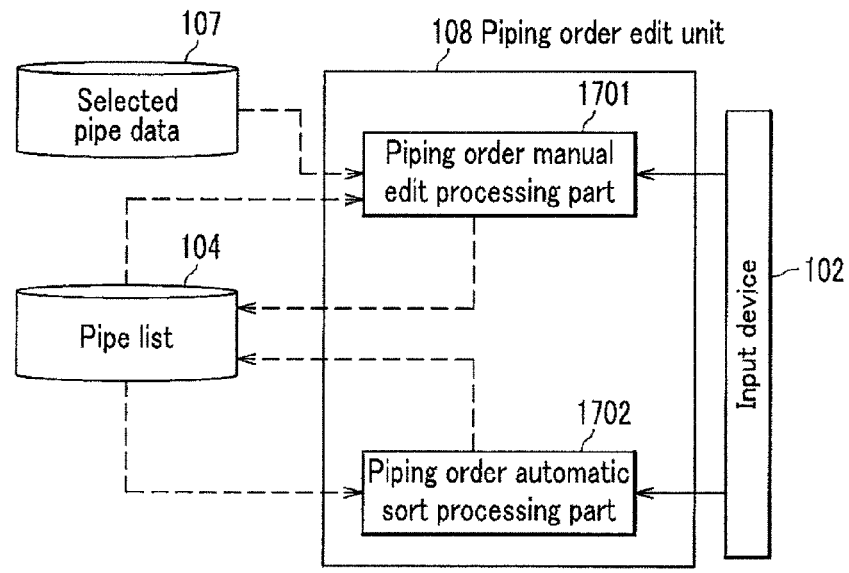
FIG. 2A and FIG. 2B are configuration diagrams illustrating a piping order edit unit and a pipe list display unit, respectively, according to the embodiment of the present invention.

FIG. 2A is a configuration diagram illustrating the piping order edit unit 108. The piping order edit unit 108 includes a piping order manual edit processing part 1701 and a piping order automatic sort processing part 1702 for changing a piping order in the pipe list 104.

The piping order manual edit processing part 1701 changes a piping order in the pipe list 104 by replacing an order of a pipe selected as the selected pipe data 107 with another in the pipe list 104. Note that the selected pipe data 107 is a variable representing a pipe in the pipe list 104 selected by a user input from the input device 102 and is updated by the pipe selection unit 106.

The piping order automatic sort processing part 1702 changes a piping order by sorting the pipes in the pipe list 104 using a value of a pipe attribute specified by the input device 102 as a key value.

Figure 2B:
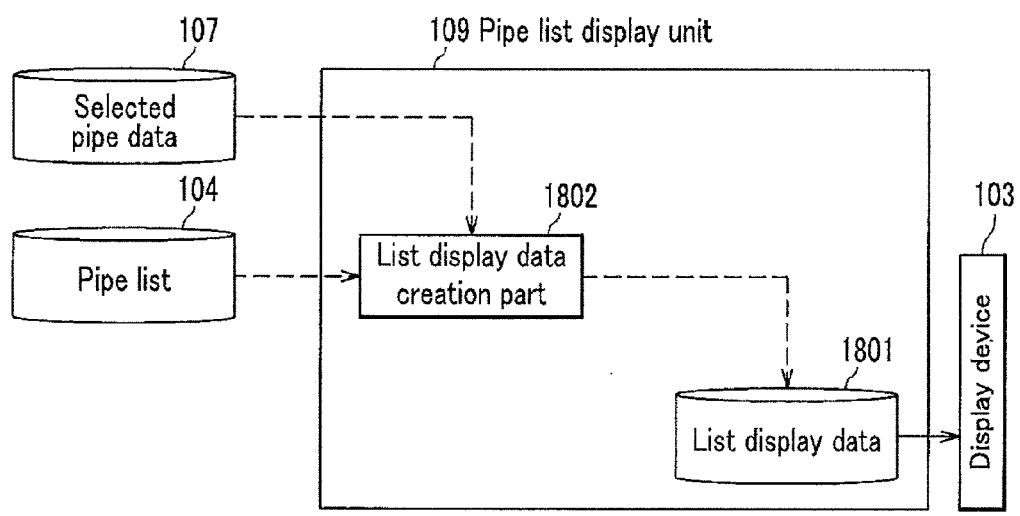

FIG. 2B is a configuration diagram illustrating the pipe list display unit 109. The pipe list display unit 109 creates a display data in the pipe list 104 displayed in the display device 103 and includes a list display data 1801 and a list display data creation part 1802.

Figures 7A, 7B, 7C:
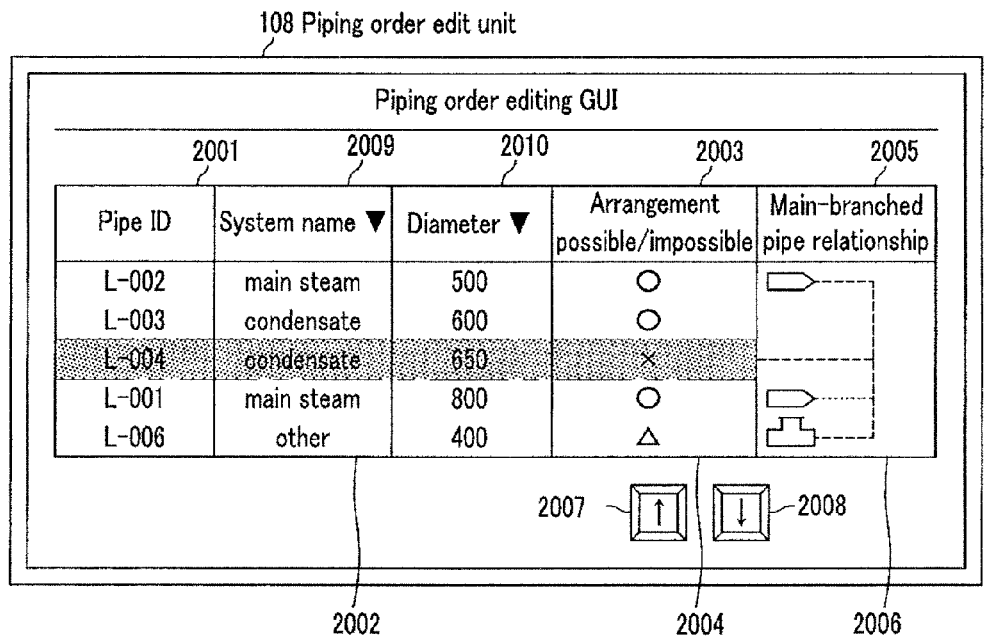
FIG. 7A is a diagram illustrating a screen of a piping order edit GUI (before a piping order edit) provided by a piping order edit unit according to the embodiment of the present invention.
FIG. 7B and FIG. 7C are explanatory diagrams illustrating data for displaying the screen according to the embodiment of the present invention.

The list display data 1801 is a display data in a two-dimensional tabular form with a plurality of cells and displays the pipe list 104 in a list format (see FIG. 7B).

The list display data creation part 1802 reads the pipe list 104 and the selected pipe data 107 and creates the list display data 1801.

Figure 3A:
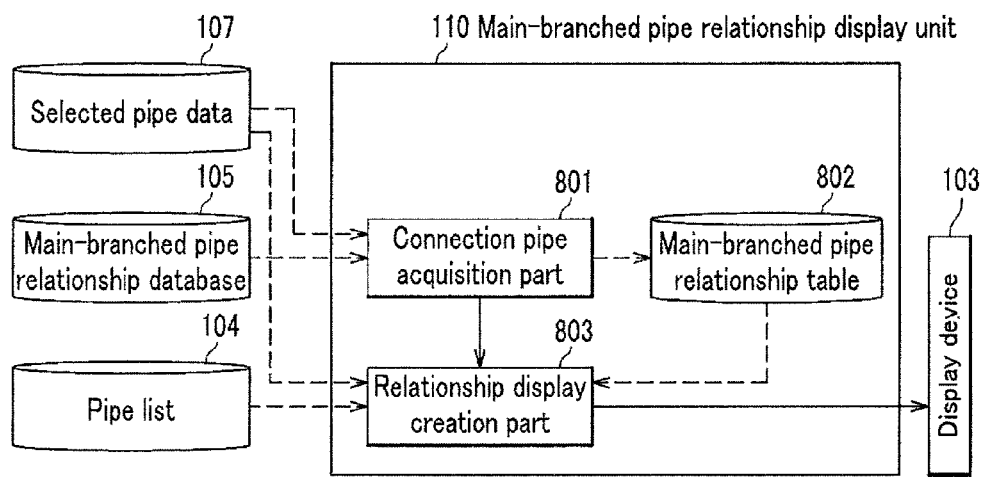
FIG. 3A and FIG. 3B are configuration diagrams illustrating a main-branched pipe relationship display unit and a relationship display creation part, respectively, according to the embodiment of the present invention.

FIG. 3A is a configuration diagram illustrating the main-branched pipe relationship display unit 110. The main-branched pipe relationship display unit 110 displays, in the display device 103, a main pipe-branched pipe relationship between a pipe selected as the selected pipe data 107 and other pipe in the pipe list 104, using the main-branched pipe relationship database 105. The main-branched pipe relationship display unit 110 includes a connection pipe acquisition part 801, a main-branched pipe relationship table 802, and a relationship display creation part 803.

The main-branched pipe relationship table 802 having a list structure holds information on a pipe having a main-branched pipe relationship with the pipe selected as the selected pipe data 107.

The connection pipe acquisition part 801 searches the main-branched pipe relationship database 105 for a pipe having a main-branched pipe relationship with the selected pipe, using a pipe selected as the selected pipe data 107 as a search key and outputs the searched result as the main-branched pipe relationship table 802.

Figure 3B:
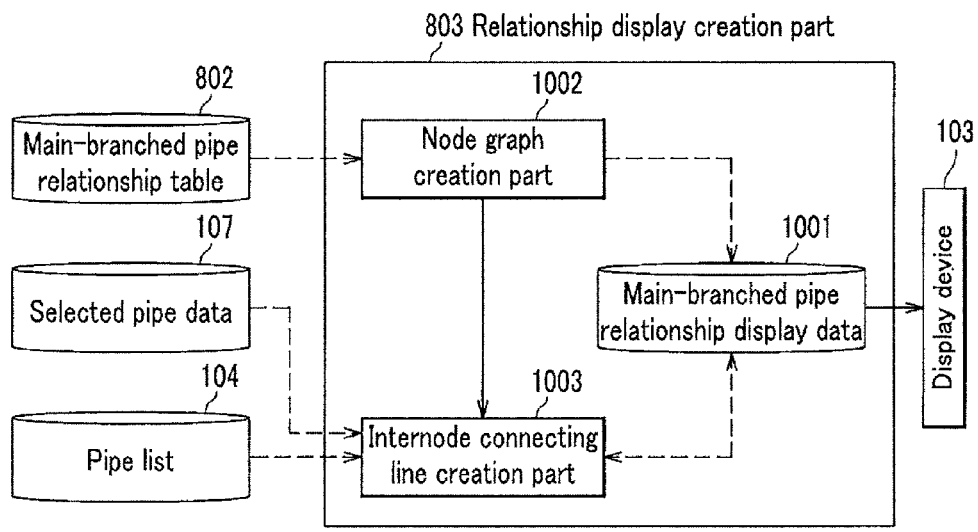

FIG. 3B is a configuration diagram illustrating the relationship display creation part 803. The relationship display creation part 803 creates a display data to be outputted to the display device 103, using the main-branched pipe relationship table 802. The relationship display creation part 803 includes a main-branched pipe relationship display data 1001, a node graph creation part 1002, and an internode connecting line creation part 1003. Details of those components will be described later with reference to FIG. 7C.

Figure 4A:
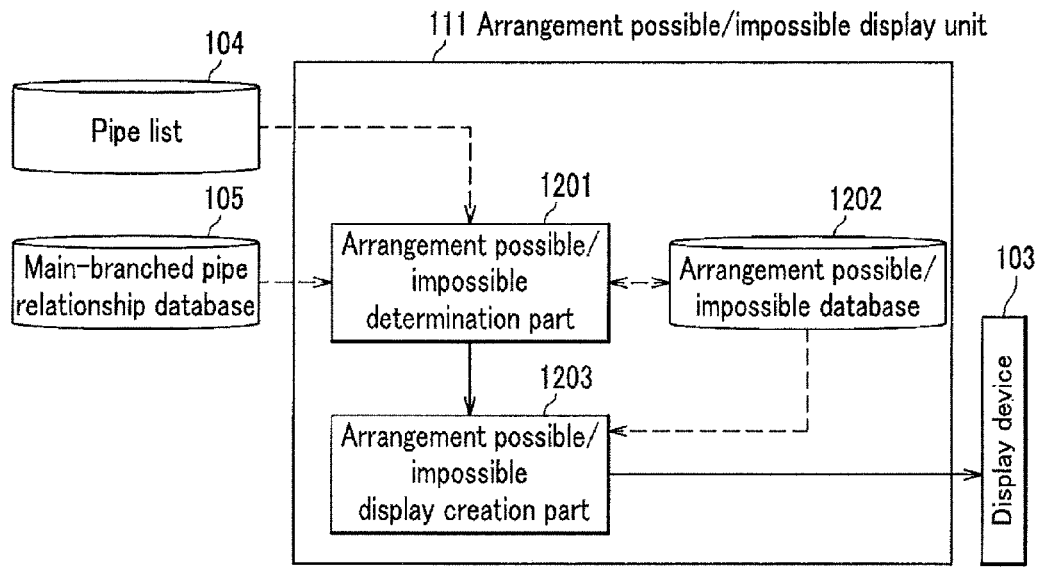
FIG. 4A and FIG. 4B are configuration diagrams illustrating an arrangement possible/impossible display unit and an arrangement possible/impossible determination part, respectively, according to the embodiment of the present invention.

FIG. 4A is a configuration diagram illustrating the arrangement possible/impossible display unit 111. The arrangement possible/impossible display unit 111 includes an arrangement possible/impossible determination part 1201, an arrangement possible/impossible database 1202, and an arrangement possible/impossible display creation part 1203. Details of those components will be described later with reference to FIG. 7C.

Figure 4B:
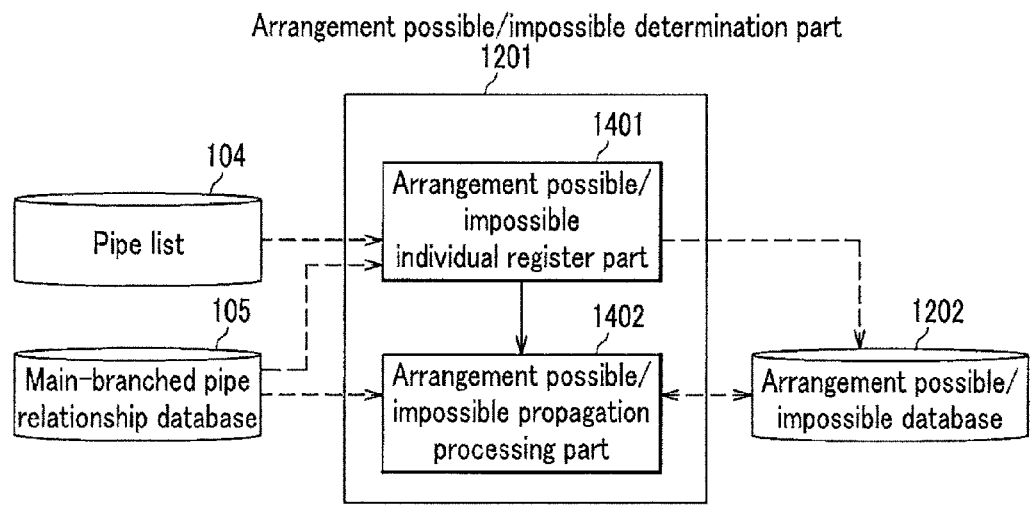

FIG. 4B is a configuration diagram illustrating the arrangement possible/impossible determination part 1201. The arrangement possible/impossible determination part 1201 determines whether or not arrangement of the each pipe in the pipe list 104 is possible, based on the main-branched pipe relationship database 105. The arrangement possible/impossible determination part 1201 includes an arrangement possible/impossible individual register part 1401 and an arrangement possible/impossible propagation processing part 1402.

The arrangement possible/impossible individual register part 1401 determines, for the each pipe in the pipe list 104, whether or not arrangement of the pipe in an order prescribed in the pipe list 104 is possible and outputs the determined result to the arrangement possible/impossible database 1202.

The arrangement possible/impossible propagation processing part 1402 performs correction of propagating, to the arrangement possible/impossible database 1202, the determined result outputted by the arrangement possible/impossible individual register part 1401 by means of tracing the main-branched pipe relationship.

FIG. 5A is a piping and instrumentation diagram illustrating a result of piping shown in the pipe list 104. Note that the piping may herein mean arrangement of an icon representing a pipe on a screen, on an edit screen of an application such as 3D-CAD (logical arrangement). Alternatively, the piping may mean arrangement of a pipe on an actual site of work (physical arrangement or routing).

For example, five pipes (L-001, L-002, L-003, L-004, and L-006) are arranged in the piping and instrumentation diagram of FIG. 5A.

The pipe "L-004" is a branched pipe. First, two main pipes "L-001" and "L-002" are arranged. Then, the branched pipe "L-004" is connected thereto at respective connection points. In other words, the pipe "L-004" cannot be suitably arranged before the pipes "L-001" and "L-002" are arranged because it is not possible to specify exact positions of the connection points.

The pipe "L-006" is also a branched pipe. Only after the main pipe "L-004" is arranged, the branched pipe can be connected thereto at an appropriate connection point.

The pipe "L-003" is not connected to any other pipe. The pipe "L-003" does not have any main pipe or branched pipe.

Figure 5B:
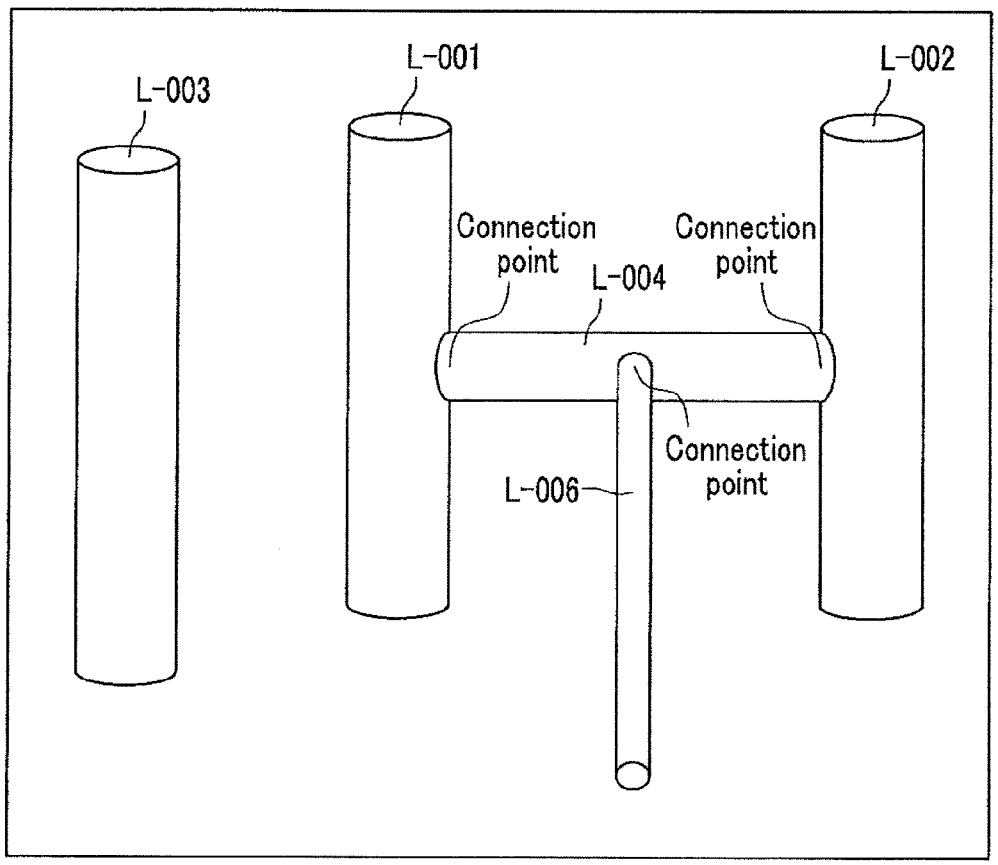

FIG. 5B is a configuration diagram illustrating the main-branched pipe relationship table 802. The main-branched pipe relationship table 802 shows, differently from the piping and instrumentation diagram of FIG. 5A, a main-branched pipe relationship (between a main pipe and a branched pipe) as information on logical connection of the pipes. For example, a connection pipe ID of a pipe connected to a pipe having the pipe ID "L-001" is "L-004". The main-branched pipe relationship therebetween is that "L-004" is a "branched pipe" of "L-001". In some cases like "L-004", one pipe ID corresponds to a plurality of connection pipe IDs.

Figure 6:
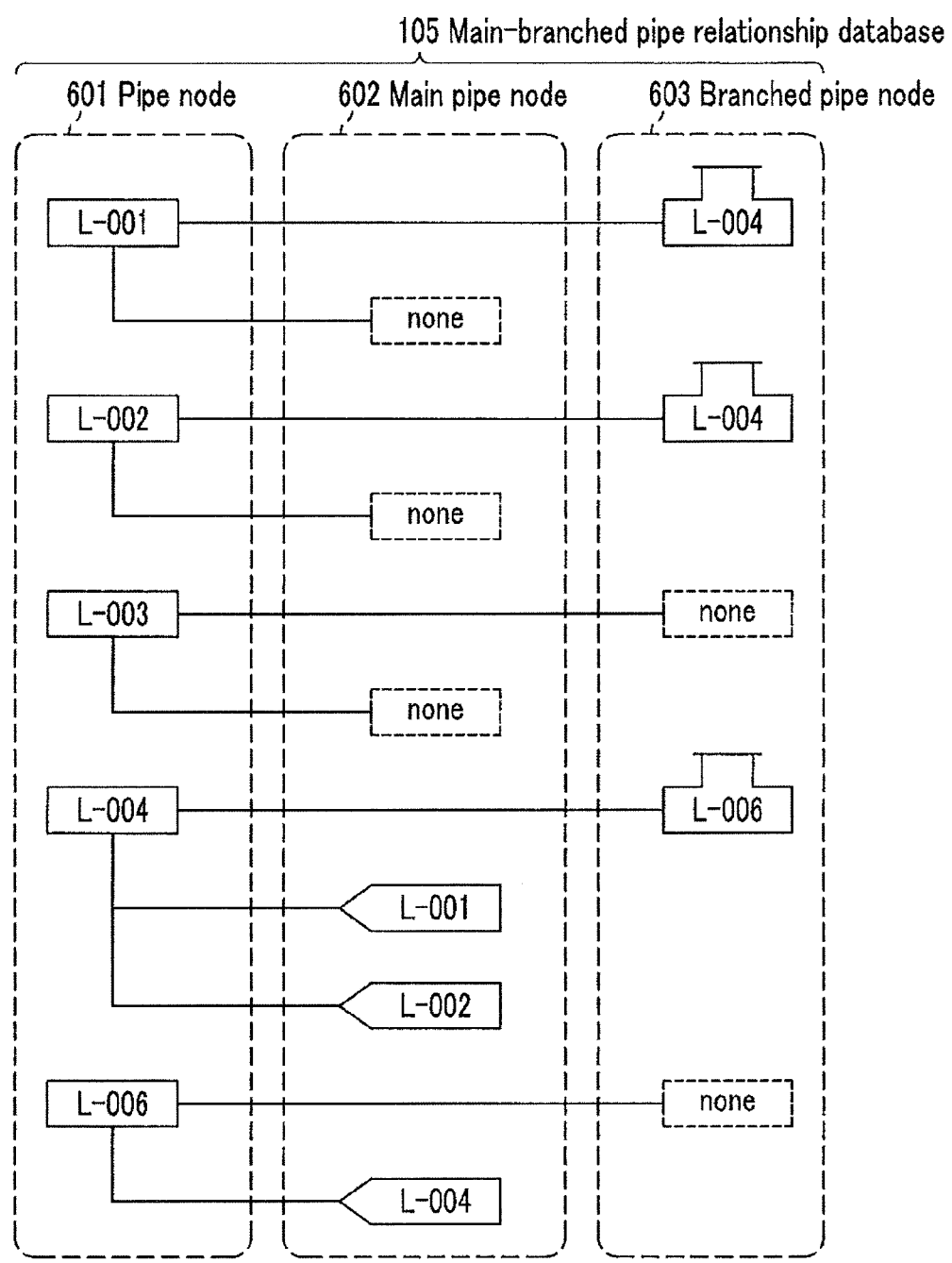
FIG. 6 is a configuration diagram illustrating a main-branched pipe relationship database according to the embodiment of the present invention.

FIG. 6 is a configuration diagram illustrating the main-branched pipe relationship database 105. The main-branched pipe relationship database 105 contains data showing a main-branched pipe relationship concerning a piping order between one pipe and another, in a tree structure. The data is inputted beforehand into a storage unit by a user in charge of editing a piping order or the like.

The main-branched pipe relationship database 105 contains: a pipe node 601 that shows identification information on a pipe in the pipe list 104; a main pipe node 602 that shows identification information on a pipe which is to be arranged before a pipe having the pipe node 601 is arranged; and a branched pipe node 603 that shows identification information on a pipe which is to be arranged after the pipe having the pipe node 601 is arranged.

The connection pipe acquisition part 801 performs <procedure 1> to <procedure 3> as shown below, to thereby create the main-branched pipe relationship table 802 based on the main-branched pipe relationship database 105.

<Procedure 1> Select a pipe ID in the pipe list 104 as the selected pipe data 107 one by one. Search the main-branched pipe relationship database 105 for the pipe node 601, using the selected pipe ID as a search key. Newly register the pipe ID used as the search key, into the main-branched pipe relationship table 802.

<Procedure 2> Newly register a pipe ID of the main pipe node 602 connected to the pipe node 601 searched in <procedure 1>, as a connection pipe ID corresponding to the pipe ID newly registered in <procedure 1>. Register "main pipe" as a main-branched pipe relationship corresponding to the newly-registered pipe ID, in the main-branched pipe relationship table 802.

<Procedure 3> Newly register the pipe ID of the branched pipe node 603 connected to the pipe node 601 searched in <procedure 1>, as a connection pipe ID corresponding to the pipe ID newly registered in <procedure 1>. Register "branched pipe" as a main-branched pipe relationship corresponding to the newly-registered pipe ID, in the main-branched pipe relationship table 802.

FIG. 7A is a diagram illustrating a screen of a piping order edit GUI provided by the piping order edit unit 108. The piping order edit GUI in tabular form includes a pipe ID display section 2001, a piping system-ordered automatic sort button 2009, a diameter-ordered automatic sort button 2010, an arrangement possible/impossible display section 2003, a main-branched pipe relationship display section 2005, a pipe attribute data display section 2002, an arrangement possible/impossible display section 2004, a main-branched pipe relationship display section 2006, an order ascending button 2007, and an order descending button 2008.

If a click is made on the order ascending button 2007 or the order descending button 2008, the piping order manual edit processing part 1701 ascends or descends an order of a row currently selected (in FIG. 7A, a row of "L-004") by one, respectively.

If a click is made on the piping system-ordered automatic sort button 2009 or the diameter-ordered automatic sort button 2010, the piping order automatic sort processing part 1702 sorts contents displayed in the piping order edit GUI, using a corresponding pipe attribute as a sort key.

The arrangement possible/impossible display section 2003 displays, for each pipe represented by the pipe ID in the pipe ID display section 2001, information on whether or not arrangement in an order displayed in the pipe ID display section 2001 is possible. "○" represents that the arrangement is possible; "x", impossible; and "Δ", possible but not recommended.

The main-branched pipe relationship display section 2005 recognizes that a pipe (herein, L-004) is currently selected as the selected pipe data 107 from among the pipes represented by the pipe IDs in the pipe ID display section 2001 and displays a main-branched pipe relationship corresponding to the recognized pipe.

FIG. 7B is a configuration diagram illustrating the list display data 1801. The list display data 1801 has data identical to that shown in three leftmost columns (pipe ID, system name, and diameter) of FIG. 7A. The list display data 1801 also highlights the pipe selected as the selected pipe data 107 (L-004).

The list display data creation part 1802 reads data on the pipes in the pipe list 104 one by one and sequentially registers the data as the list display data 1801. The list display data creation part 1802 also highlights a row corresponding to a pipe as the selected pipe data 107.

FIG. 7C is a configuration diagram illustrating the arrangement possible/impossible database 1202. The arrangement possible/impossible database 1202 includes data identical to that shown in the first and the fourth leftmost columns (pipe ID and arrangement possible/impossible) of FIG. 7A.

The arrangement possible/impossible determination part 1201 registers whether or not arrangement of the each pipe is possible according to the piping order shown in the pipe list 104, in the arrangement possible/impossible database 1202. The arrangement possible/impossible display unit 111 displays data contents in the arrangement possible/impossible database 1202, in the arrangement possible/impossible display section 2003.

The main-branched pipe relationship display data 1001 displayed in the main-branched pipe relationship display section 2006 is graphic data which displays a piping order relationship between a pipe as the selected pipe data 107 and a pipe registered in the main-branched pipe relationship table 802.

The main-branched pipe relationship display section 2006 includes: the pipe node 601 which is currently selected (L-004); the pipe main pipe node 602 which is arranged before the pipe having the pipe node 601 is arranged (L-001, L-002); and the branched pipe node 603 which is arranged after the pipe having the pipe node 601 is arranged (L-006), which are connected in broken lines accordingly.

The relationship display creation part 803 performs <procedure 1> to <procedure 4> as shown below, to thereby create the main-branched pipe relationship display data 1001 displayed in the main-branched pipe relationship display section 2006.

<Procedure 1> The node graph creation part 1002 prepares a space corresponding to the number of pipes included in the pipe list 104 (herein, 5 rows), in the main-branched pipe relationship display section 2006.

<Procedure 2> The node graph creation part 1002 searches the main-branched pipe relationship table 802 for a pipe ID using the selected pipe data 107 (L-004) as a search key and acquires a list of a connection pipe ID corresponding to the searched pipe ID (L-001, L-002, L-006).

<Procedure 3> The node graph creation part 1002 places an icon of a node for each connection pipe ID specified in <procedure 2>, in the prepared space in the main-branched pipe relationship display section 2006. Note that, if a connection pipe ID has the main-branched pipe relationship of "main pipe", an icon thereof in a pentagonal shape represents the main pipe node 602. If a connection pipe ID has the main-branched pipe relationship of "branched pipe", an icon thereof in a convex shape represents the branched pipe node 603.

<Procedure 4> The internode connecting line creation part 1003 draws a dashed line starting from a row corresponding to a pipe as the selected pipe data 107 and then extends the dashed line until the row of the pipe is accordingly connected to the each node placed in <procedure 3>.

Figure 8:
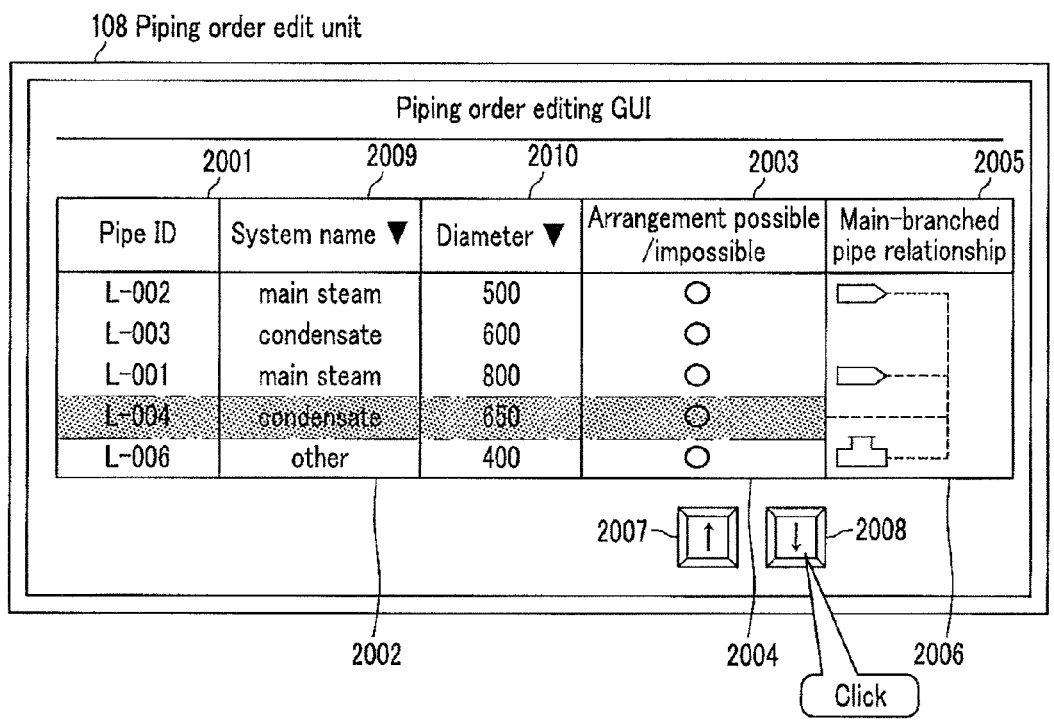
FIG. 8 is a diagram illustrating a screen of the piping order edit GUI (after the piping order edit) provided by the piping order edit unit according to the embodiment of the present invention.

FIG. 8 is a diagram illustrating a screen after the piping order is edited via the piping order edit GUI of FIG. 7A.

In the piping order edit GUI of FIG. 7A, the editor selects the row of L-004 which includes the arrangement possible/impossible display section 2004 of "x". The selected row is highlighted. The editor then recognizes a problem via the piping order edit GUI that, in the main-branched pipe relationship display section 2006, the piping order of a main pipe to be arranged prior to the selected L-004 (the main pipe node 602 of L-001) is situated after the selected L-004. That is, the piping order of L-001 in the forth row is inappropriately situated after that of L-004 in the third row.

As shown in the piping order edit GUI of FIG. 8, upon receipt of a click of the order descending button 2008 by the editor, the input device 102 reverses the order between the selected row of L-004 and the row of L-001 which is positioned just below the row of L-004. Following the change in the order, data contained in the arrangement possible/impossible display section 2004 and the main-branched pipe relationship display section 2006 are subjected to recalculation.

As a result of the recalculation, as shown in FIG. 8, all of the contents in the arrangement possible/impossible display section 2004 are translated into "○". The editor can thus recognize that the piping order becomes appropriate.

Figure 9:
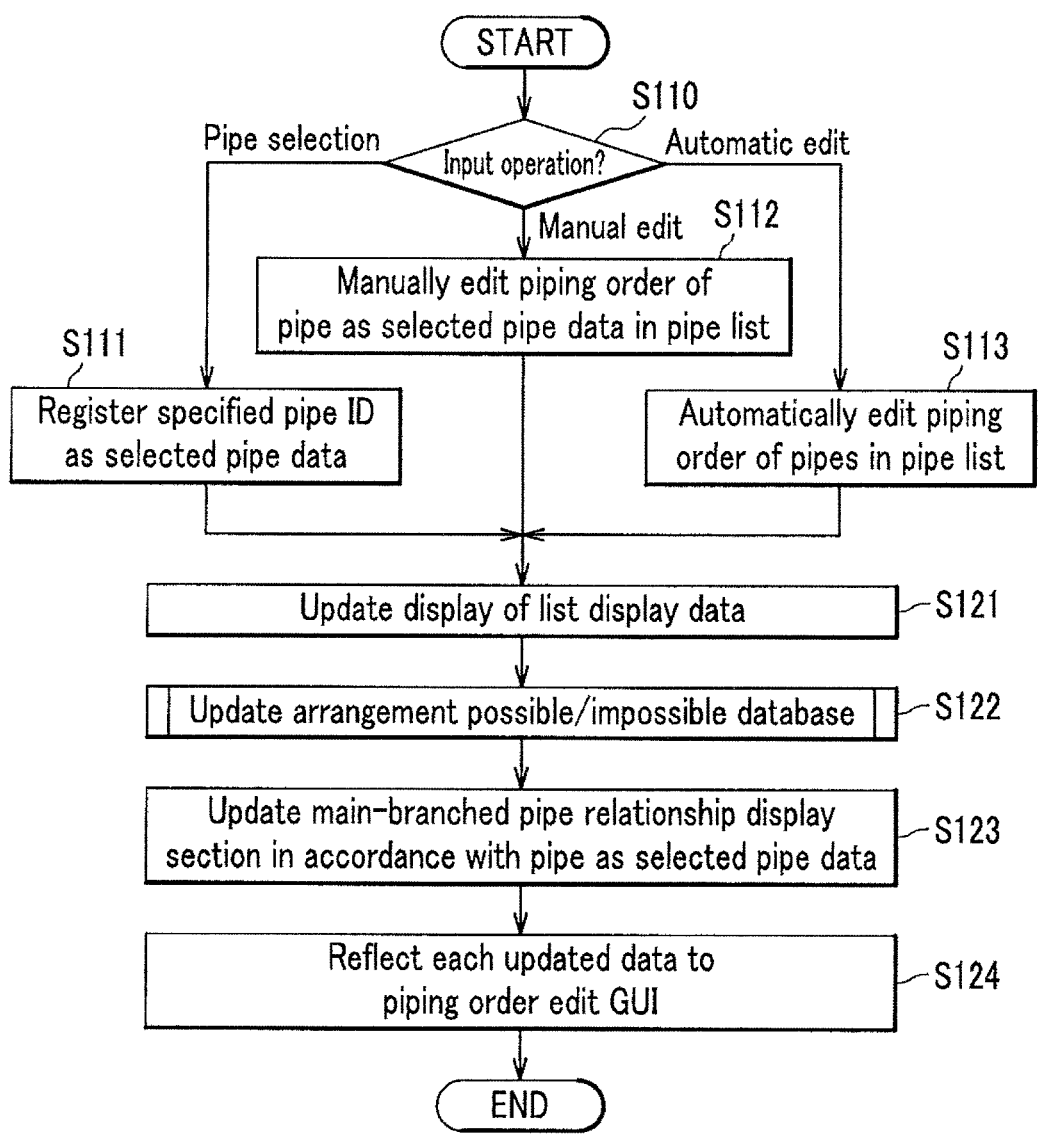
FIG. 9 is a flowchart illustrating that the design assist system assists a piping order edit according to the embodiment of the present invention.

FIG. 9 is a flowchart illustrating a processing in which the design assist system of FIG. 1A assists a piping order edit.

S110 is a step in which the input device 102 receives an input operation by a user via the piping order edit GUI of FIG. 7.

S111 is a step of selecting a pipe. The input device 102 specifies one pipe ID in the pipe ID display section 2001 in response to a user's operation (a click). The pipe selection unit 106 registers the specified pipe ID as the selected pipe data 107. The pipe list display unit 109 updates a display of the piping order edit GUI. The term "update" used herein means highlight a row corresponding to a pipe as the selected pipe data 107.

S112 is a step of manually editing a piping order. The input device 102 detects a press-down of the order ascending button 2007 (to exchange the row of the selected pipe data 107 for a row just above itself) or the order descending button 2008 (to exchange the row of the selected pipe data 107 for a row just below itself) according to a user's operation (a click). The piping order manual edit processing part 1701 changes the piping order of the selected pipe data 107 in the pipe list 104 in accordance with the detected button operation.

S113 is a step of automatically editing a piping order. The input device 102 detects a press-down of the piping system-ordered automatic sort button 2009 (a sort processing using a system name as a sort key) or the diameter-ordered automatic sort button 2010 (a sort processing using a diameter as a sort key) according to a user's operation (a click). The piping order automatic sort processing part 1702 changes the piping order of the selected pipe data 107 in the pipe list 104 according to the detected button operation.

S121 is a step of updating the list display data 1801. As explained above with reference to FIG. 7B, the list display data creation part 1802 reads, one by one, data on the pipes in the pipe list 104 which have been updated in S112 to S113 and sequentially registers the data as the list display data 1801. The list display data creation part 1802 also highlights a row corresponding to a pipe as the selected pipe data 107.

S122 is a step of updating the arrangement possible/impossible database 1202. As explained above with reference to FIG. 7C, the arrangement possible/impossible determination part 1201 registers whether or not arrangement of the each pipe is possible according to the piping order as shown in the pipe list 104 updated in S112 to S113, in the arrangement possible/impossible database 1202. Details of the step of S122 will be described later with reference to FIG. 10.

S123 is a step of updating the main-branched pipe relationship display section 2006. The main-branched pipe relationship display unit 110 acquires a pipe having a main-branched pipe relationship with the pipe as the selected pipe data 107 updated in S111, from the main-branched pipe relationship database 105 and updates a display of the main-branched pipe relationship in the piping order. That is, along with the update of the piping order shown in the pipe list 104, positions in which the pipe node 601, the main pipe node 602, and the branched pipe node 603 are displayed are also updated.

S124 is a step of reflecting each updated data to the piping order edit GUI. The piping order edit unit 108 reflects each display data in the piping order edit GUI updated in S121 to S123, to the piping order edit GUI. For example, the arrangement possible/impossible display creation part 1203 creates a display data on the arrangement possible/impossible, using the arrangement possible/impossible database 1202. The display data outputted to the display device 103 is represented by, for example, signs ○, Δ, and x which are used for representing the "arrangement possible/impossible" in the arrangement possible/impossible database 1202 of FIG. 7C.

Figure 10:
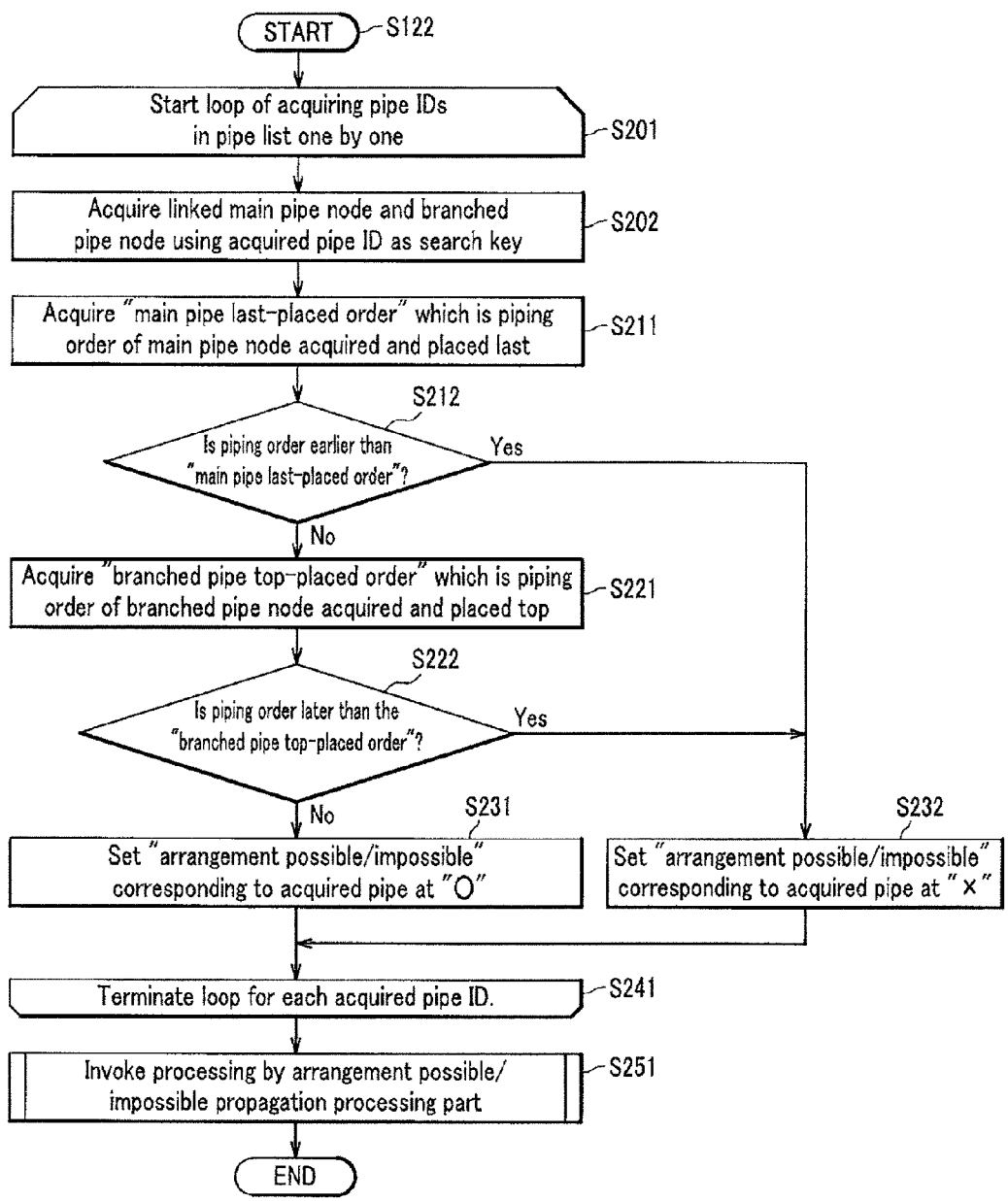
FIG. 10 is a flowchart illustrating a processing performed by an arrangement possible/impossible individual register part in updating an arrangement possible/impossible database according to the embodiment of the present invention.

FIG. 10 is a flowchart illustrating a processing performed by the arrangement possible/impossible individual register part 1401 in updating the arrangement possible/impossible database 1202.

In S201, the pipe IDs in the pipe list 104 are acquired one by one. Then, a loop is started for each of the acquired pipe IDs.

In S202, the main-branched pipe relationship database 105 is searched for the pipe node 601 using the pipe ID acquired in S201 as a search key, to thereby acquire the main pipe node 602 and the branched pipe node 603 linked to the searched pipe node 601.

In S211, a "main pipe last-placed order" is acquired which is a piping order of the main pipe node 602 acquired in S202 and is placed last (positioned the lowest) of the one or more acquired main pipe nodes 602 in the pipe list 104.

In S212, it is determined whether or not a piping order of a pipe having the pipe ID acquired in S201 is earlier than the "main pipe last-placed order" (positioned higher in the pipe list 104). If Yes in S212, the processing advances to S232. If No in S212, the processing advances to S221.

In S221, a "branched pipe top-placed order" is acquired which is a piping order of the branched pipe node 603 acquired in S202 and is placed top (positioned the highest) of the one or more acquired branched pipe nodes 603 in the pipe list 104.

In S222, it is determined whether or not a piping order of a pipe having the pipe ID acquired in S201 is later than the "branched pipe top-placed order" (positioned lower in the pipe list 104). If Yes in S222, the processing advances to S232. If No in S222, the processing advances to S231.

In S231, the "arrangement possible/impossible" corresponding to the pipe acquired in S201 is set at "○".

In S232, the "arrangement possible/impossible" corresponding to the pipe acquired in S201 is set at "x".

If there is a branched pipe positioned higher than the pipe acquired in S201 (which may also be referred to as a pipe subjected to determination) in the pipe list 104 (if Yes in S222) or if there is a main pipe positioned lower than the pipe subjected to determination in the pipe list 104 (if Yes in S212), the "arrangement possible/impossible" is set at "x" (S232).

In S241, the loop for the each pipe ID acquired in S201 is terminated.

In S251, a processing performed by the arrangement possible/impossible propagation processing part 1402 is invoked.

Figure 11:
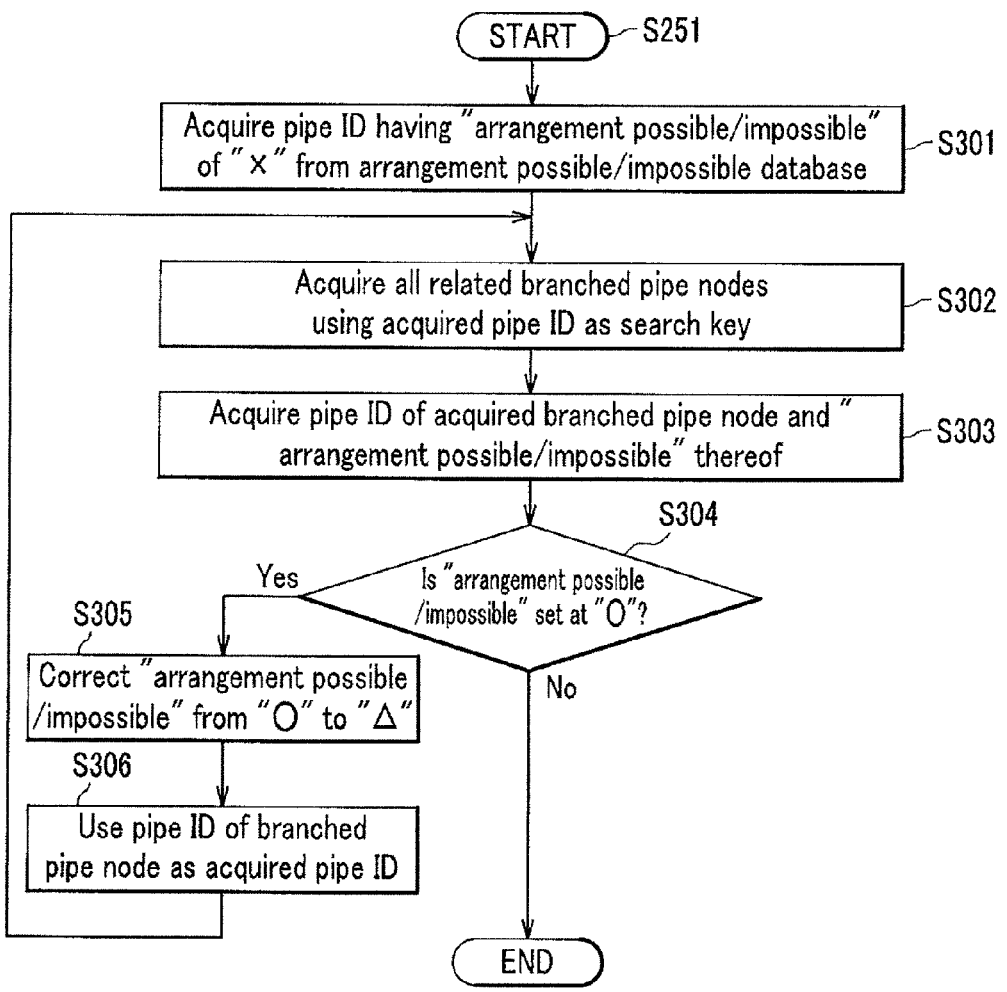
FIG. 11 is a flowchart illustrating a processing performed by an arrangement possible/impossible propagation processing part in updating the arrangement possible/impossible database according to the embodiment of the present invention.

FIG. 11 is a flowchart illustrating the processing performed by the arrangement possible/impossible propagation processing part 1402 (S251) in updating the arrangement possible/impossible database 1202. In the processing of FIG. 11, if the "arrangement possible/impossible" of a given pipe is "○" in the arrangement possible/impossible database 1202, and at the same time, the "arrangement possible/impossible" of a main pipe corresponding to the given pipe is "x", the "arrangement possible/impossible" of the given pipe is corrected to "Δ".

Such a correction processing makes it possible for a user to know that the piping order of a given pipe, even though currently in the right order, is likely to be corrected along with a change in the piping order of a main pipe corresponding thereto.

For example, the "arrangement possible/impossible" of L-006 in FIG. 7A is "○" before the arrangement possible/impossible propagation processing part 1402 is invoked (S241). Then, the processing by the arrangement possible/impossible propagation processing part 1402 shown in FIG. 11 is performed to correct the "arrangement possible/impossible" of L-006 to "Δ" because the "arrangement possible/impossible" of L-004 which is a main pipe corresponding to the L-006 is "x".

In S301, the arrangement possible/impossible database 1202 is referenced to acquire a pipe ID having the "arrangement possible/impossible" of "x". The acquired pipe ID is a pipe ID of the "qmain pipe corresponding to the given pipe".

In S302, the main-branched pipe relationship database 105 is searched for the pipe node 601 using the pipe ID acquired in S301 as a search key, to thereby acquire all of the related branched pipe nodes 603. A pipe ID of the acquired branched pipe node 603 is a pipe ID of the "given pipe".

In S303, the arrangement possible/impossible database 1202 is searched using the pipe ID of the branched pipe node 603 acquired in S302 as a search key, to thereby acquire a pipe ID and an "arrangement possible/impossible" thereof corresponding to the search key.

In S304, it is determined whether or not a current "arrangement possible/impossible" of the pipe acquired in S303 is "○". If Yes in S304, the processing advances to S305. If No in S304, the processing is terminated.

In S305, the "arrangement possible/impossible" of the pipe corresponding to the branched pipe node 603 acquired in S303 is corrected from "○" to "Δ".

In S306, the pipe ID of the branched pipe node 603 acquired in S303 is used as the "main pipe corresponding to the given pipe" in S301. Then, the processing returns to S302. The "given pipe" is thus recursively changed, which allows the correction processing of the branched pipe node 603 to be propagated one after another.

The embodiment as described above provides a method of displaying a main-branched pipe relationship of pipes to be arranged and editing a piping order of the pipes in a simple way. More specifically, whether or not arrangement of the each pipe is possible is displayed. The each pipe constitutes a pipe list in which the pipes are arranged in an arbitrary order according to a pipe attribute or a user's operation. A main-branched pipe relationship between the pipes which restricts the piping order is also displayed.

Thus, both whether or not the arrangement of the each pipe is possible and a piping order relationship of one pipe with others is displayed at the same time. This makes it possible for a user to instantly recognize the piping order relationship between the pipes, based on which the arrangement possible/impossible is determined. This also makes it possible to perform a speedy edit operation of a piping order of the pipes taking restriction of the piping order into account.

In accordance with the present invention, whether or not a piping satisfies restriction of a piping order can be verified by a computer.

The invention claimed is:

1. A design assist device which verifies a piping order of a plurality of pipes to be arranged, comprising:
   a storage unit,
   an arrangement possible/impossible determination part, and an arrangement possible/impossible display creation part,
wherein the storage unit stores therein: a pipe list constituted by an ordered set made up of a plurality of the pipes whose piping order is subjected to verification, and a main-branched pipe relationship database in which a given pipe is made to correspond to none or more main pipes each of which is arranged before the given pipe, and also to none or more branched pipes each of which is arranged after the given pipe,
wherein the arrangement possible/impossible determination part:
reads the pipe list from the storage unit and determines a pipe in the pipe list as a pipe subjected to determination,
searches the given pipe in the main-branched pipe relationship database using identification information on the pipe subjected to determination as a search key, acquires a main pipe and a branched pipe corresponding to the searched given pipe, and identifies positions of the acquired main pipe and branched pipe in the pipe list, and,
if there is a branched pipe which is situated in a position before the pipe subjected to determination in the pipe list or if there is a main pipe which is situated in a position after the pipe subjected to determination in the pipe list, determines that arrangement of the pipe subjected to determination is impossible, and, if not, determines that the arrangement of the pipe subjected to determination is possible, and
wherein the arrangement possible/impossible display creation part makes a display device display the arrangement possible/impossible of the pipe subjected to determination determined by the arrangement possible/impossible determination part.

2. The design assist device according to claim 1,
wherein the arrangement possible/impossible determination part, after the determination of the arrangement possible/impossible of each of the pipes in the pipe list, selects a pipe whose arrangement is impossible, searches the main-branched pipe relationship database for a branched pipe corresponding to the selected pipe using identification information on the selected pipe as a search key, acquires the searched branched pipe, and corrects the arrangement possible/impossible of the acquired branched pipe from "possible" to "not recommended".

3. The design assist device according to claim 1, further comprising a main-branched pipe relationship display unit,
wherein, if a pipe to be highlighted is selected from among the pipes in the pipe list via an input device, the main-branched pipe relationship display unit:
searches the main-branched pipe relationship database for the given pipe using identification information on the pipe to be highlighted as a search key, acquires a main pipe and a branched pipe each corresponding to the searched given pipe, and identifies each position of the acquired main pipe and the acquired branched pipe, in the pipe list, and
makes the display device display information on orders of the each pipe in the pipe list, and also makes the display device connectedly display: a highlighted display showing the pipe to be highlighted in the information on orders; an icon representing the main pipe acquired in the information on orders; and an icon representing the acquired branched pipe in the information on orders.

4. The design assist device according to claim 2, further comprising a main-branched pipe relationship display unit,
wherein, if a pipe to be highlighted is selected from among the pipes in the pipe list via an input device, the main-branched pipe relationship display unit:
searches the main-branched pipe relationship database for the given pipe using identification information on the pipe to be highlighted as a search key, acquires a main pipe and a branched pipe each corresponding to the searched given pipe, and identifies each position of the acquired main pipe and the acquired branched pipe, in the pipe list, and
makes the display device display information on orders of the each pipe in the pipe list, and also makes the display device connectedly display: a highlighted display showing the pipe to be highlighted in the information on orders; an icon representing the main pipe acquired in the information on orders; and an icon representing the acquired branched pipe in the information on orders.

5. The design assist device according to claim 3, further comprising a piping order edit processing unit,
wherein the piping order edit processing unit, upon receipt of an operation of changing an order of the pipe to be highlighted via the input device, switches the order of the pipe to be highlighted with that of another pipe according to the received operation, updates the information on orders of the pipe list, and writes the updated information on orders to the storage unit, and
wherein the arrangement possible/impossible determination part recalculates the arrangement possible/impossible of the each pipe constituting the updated pipe list.

6. The design assist device according to claim 4, further comprising a piping order edit processing unit,
wherein the piping order edit processing unit, upon receipt of an operation of changing an order of the pipe to be highlighted via the input device, switches the order of the pipe to be highlighted with that of other pipe according to the received operation, updates the information on orders of the pipe list, and writes the updated information on orders to the storage unit, and
wherein the arrangement possible/impossible determination part recalculates the arrangement possible/impossible of the each pipe constituting the updated pipe list.

7. The design assist device according to claim 1, further comprising a piping order edit processing unit,
wherein the pipe list stored in the storage unit includes the identification information on the each pipe as well as attribute information on the each pipe, which are made to correspond to each other,
wherein the piping order edit processing unit, upon receipt of an operation of selecting attribute information of a pipe via the input device, sorts an order of the pipes in the pipe list using attribute information on the selected pipe as a sort key, updates the information on orders in the pipe list, and writes the updated information on orders to the storage unit, and
wherein the arrangement possible/impossible determination part recalculates the arrangement possible/impossible of the each pipe constituting the updated pipe list.

8. The design assist device according to claim 2, further comprising a piping order edit processing unit,
wherein the pipe list stored in the storage unit includes the identification information on the each pipe as well as attribute information on the each pipe, which are made to correspond to each other, wherein the piping order edit processing unit, upon receipt of an operation of selecting attribute information of a pipe via the input device, sorts an order of the pipes in the pipe list using attribute information on the selected pipe as a sort key, updates the information on orders in the pipe list, and writes the updated information on orders to the storage unit, and wherein the arrangement possible/impossible determination part recalculates the arrangement possible/impossible of the each pipe constituting the updated pipe list.

9. The design assist device according to claim 3, further comprising a piping order edit processing unit, wherein the pipe list stored in the storage unit includes the identification information on the each pipe as well as attribute information on the each pipe, which are made to correspond to each other, wherein the piping order edit processing unit, upon receipt of an operation of selecting attribute information of a pipe via the input device, sorts an order of the pipes in the pipe list using attribute information on the selected pipe as a sort key, updates the information on orders in the pipe list, and writes the updated information on orders to the storage unit, and wherein the arrangement possible/impossible determination part recalculates the arrangement possible/impossible of the each pipe constituting the updated pipe list.

10. The design assist device according to claim 4, further comprising a piping order edit processing unit, wherein the pipe list stored in the storage unit includes the identification information on the each pipe as well as attribute information on the each pipe, which are made to correspond to each other, wherein the piping order edit processing unit, upon receipt of an operation of selecting attribute information of a pipe via the input device, sorts an order of the pipes in the pipe list using attribute information on the selected pipe as a sort key, updates the information on orders in the pipe list, and writes the updated information on orders to the storage unit, and wherein the arrangement possible/impossible determination part recalculates the arrangement possible/impossible of the each pipe constituting the updated pipe list.

11. A design assist method performed by a design assist device which verifies a piping order of a plurality of pipes to be arranged, the design assist device including a storage unit, an arrangement possible/impossible determination part, and an arrangement possible/impossible display creation part, the storage unit storing therein a pipe list constituted by an ordered set made up of a plurality of the pipes whose piping order is subjected to verification, and a main-branched pipe relationship database in which a given pipe is made to correspond to none or more main pipes each of which is arranged before the given pipe, and also to none or more branched pipes, each of which is arranged after the given pipe, the design assist method comprising:

reading the pipe list from the storage unit and determining a pipe in the pipe list as a pipe subjected to determination, searching for the given pipe in the main-branched pipe relationship database using identification information on the pipe subjected to determination as a search key, acquiring a main pipe and a branched pipe corresponding to the searched given pipe, identifying positions of the acquired main pipe and branched pipe in the pipe list, determining, if there is a branched pipe which is situated in a position before the pipe subjected to determination in the pipe list or if there is a main pipe which is situated in a position after the pipe subjected to determination in the pipe list, that arrangement of the pipe subjected to determination is impossible, and, if not, that the arrangement of the pipe subjected to determination is possible, and making a display device display an arrangement possible/impossible condition of the pipe subjected to determination by the arrangement possible/impossible determination part.

* * * * *